United States Patent
Warren

(10) Patent No.: US 6,440,039 B1
(45) Date of Patent: Aug. 27, 2002

(54) TORQUE-TRANSMITTING SYSTEM

(75) Inventor: Robin John Warren, Leamington Spa (GB)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 57 days.

(21) Appl. No.: 09/639,125

(22) Filed: Aug. 15, 2000

(30) Foreign Application Priority Data

Aug. 16, 1999 (GB) .............................................. 9919179

(51) Int. Cl.⁷ .............................................. B60K 41/02
(52) U.S. Cl. ........................................... 477/86; 477/76
(58) Field of Search ........................... 477/174, 70, 76, 477/80, 86; 192/3.63

(56) References Cited

U.S. PATENT DOCUMENTS

| | | | | |
|---|---|---|---|---|
| 4,366,890 A | * | 1/1983 | Suckow | 192/101 X |
| 4,678,069 A | * | 7/1987 | Yoshimura et al. | 477/76 |
| 4,768,636 A | * | 9/1988 | Ito et al. | 477/78 X |
| 5,427,215 A | * | 6/1995 | Jarvis | 192/3.63 |
| 5,803,863 A | * | 9/1998 | Hayward et al. | 477/98 |
| 5,902,211 A | * | 5/1999 | Jones et al. | 477/174 X |
| 6,042,503 A | * | 3/2000 | Kosik et al. | 477/86 X |
| 6,148,975 A | * | 11/2000 | Shih | 192/3.62 |
| 6,213,911 B1 | * | 4/2001 | Salecker et al. | 477/174 X |

FOREIGN PATENT DOCUMENTS

| | | | |
|---|---|---|---|
| EP | 0038113 | 10/1981 | |
| EP | 0043660 | 1/1982 | |
| EP | 0059035 | 9/1982 | |
| EP | 0696341 | 1/1983 | |
| EP | 0101200 | 2/1984 | |
| EP | 0147227 | * 7/1985 | 192/3.63 |
| EP | 0735957 | 9/1998 | |
| GB | 2302377 | 1/1997 | |
| WO | WO 92/13208 | 8/1992 | |

* cited by examiner

Primary Examiner—Charles A Marmor
Assistant Examiner—Roger Pang
(74) Attorney, Agent, or Firm—Darby & Darby

(57) ABSTRACT

A torque-transmitting system for vehicles has a main drive clutch operable by means of a clutch-actuator, a transmission, a shift mechanism for setting the transmission ratio, a selector lever allowing the driver to select between a neutral mode or a drive mode of the transmission, and electronic control means for controlling the clutch actuator and the shift. mechanism. The electronic control means will cause the clutch-actuator to disengage the clutch when the engine is started and to re-engage the clutch if the transmission has been left in neutral mode for a preprogrammed time period while the vehicle is standing still, so as to turn the input shaft of the transmission and thereby warm up the transmission oil.

11 Claims, 1 Drawing Sheet

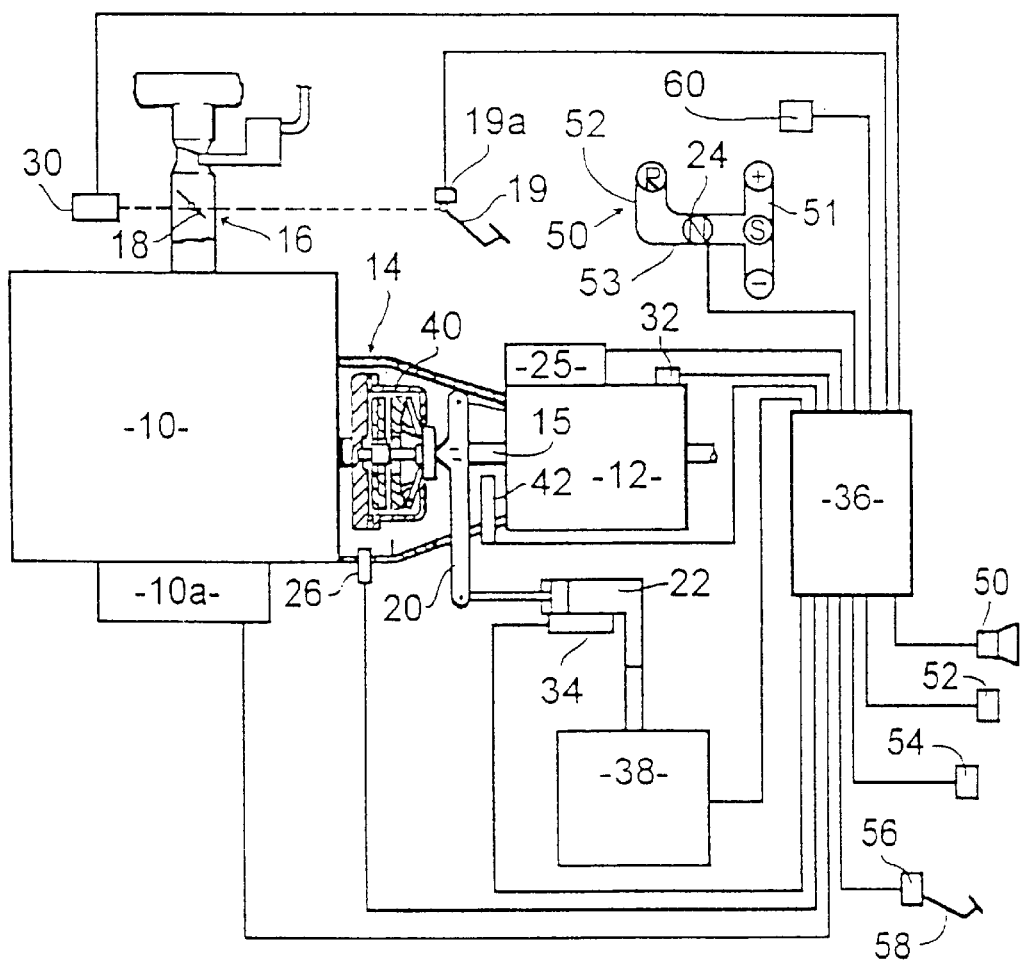

TORQUE-TRANSMITTING SYSTEM

BACKGROUND OF THE INVENTION

The invention relates to an automated or semi-automated torque-transmitting system such as, e.g., the transmission of a vehicle. The torque-transmitting systems discussed here have a main drive clutch that couples the torque-transmitting system to a prime mover, a clutch-actuating means for controlling the state of engagement of the clutch, a transmission with a plurality of transmission ratios, a shifting mechanism for setting an operating ratio of the transmission, and a driver-operable mode-selector lever allowing a driver to select between a neutral mode or a drive mode of the transmission.

In torque-transmitting systems of this type, when starting from a stand-still, the clutch is in the disengaged condition and a start-up gear is selected automatically. Then, the clutch is engaged as the accelerator pedal is actuated. A torque-transmitting system of this type is disclosed in UK Patent No. 2302377, whose content is hereby expressly included by reference in the disclosure of the present application.

Typically in torque-transmitting systems of this type, upon starting the engine the torque-transmitting system is activated and the clutch is automatically disengaged. Moving the mode-selector lever, which may be a selector or shift lever, from a neutral mode N to a drive mode, e.g., D (forward drive) or R (reverse) will cause a start-up gear to be automatically selected.

The disengagement of the clutch when the transmission is being activated has the disadvantage that the transmission input shaft is not set in motion. Consequently, no rotation of meshed gears is taking place to warm up the transmission oil.

Therefore, if the engine is left running to warm up after a cold start, the engine coolant and engine oil will be brought up to temperature, but the transmission oil, and thus the transmission itself, will not be warmed up.

OBJECT OF THE INVENTION

It is therefore the object of the present invention to further develop a torque-transmitting system of the kind described above, so that the transmission, too, will be warmed up when the engine is left running after a cold start.

SUMMARY OF THE INVENTION

According to one aspect of the present invention, the foregoing objective is met by a torque-transmitting system for vehicles that belongs to the kind described above and is further equipped with electronic control means to control the clutch-actuating means and the shifting mechanism, where the electronic control means will cause the clutch-actuating means to disengage the clutch when the engine is started and will also cause the clutch-actuating means to re-engage the clutch in the case where the transmission has been left in neutral mode for a preprogrammed time period while the vehicle is standing still.

Re-engaging the clutch in this manner will cause the transmission input shaft to be driven so that the rotation of meshed gears will warm up the transmission oil.

According to a preferred embodiment of the present invention, the preprogrammed time period is of the order of 5 seconds. Preferably, re-engagement of the clutch in this manner will take place only under cold start conditions, if for example:

a. the transmission oil temperature is below a preprogrammed level of, e.g., 0° Celsius and/or b. the engine is idling at a higher speed than a preprogrammed value of, e.g., 1200 rpm, which would indicate that the idle speed is raised due to engine warm-up.

Preferably, the foregoing warm-up procedure is terminated and the clutch is taken out of engagement under the following conditions:

a. in the presence of activities to engage a start-up gear, e.g., by moving the drive mode lever from neutral to a drive mode, and/or b. if the transmission oil temperature rises above a preprogrammed value of, e.g., 0° Celsius, and/or c. if the idling speed of the engine falls below a preprogrammed minimum value of, e.g., 900 rpm, which would indicate that the engine is warmed up or is about to stall, and/or d. if the vehicle begins to move.

The re-engagement of the clutch according to the present invention can be inhibited by a suitable action of the driver, even if the foregoing conditions are otherwise met, for example by moving the brake pedal or the accelerator pedal out of their rest positions, or by any movement of the mode-selector or gear-shift selecting means.

The re-engagement of the clutch in accordance with the present invention is allowed to take place if the transmission is in neutral mode because the respective step for putting the vehicle in motion or for engaging a start-up gear has not been taken, or because the start-up gear has been automatically disengaged by intervention of the electronic control unit.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The following detailed description, relating to an example of an embodiment of the invention, is based on the attached drawing consisting of one FIGURE representing a schematic illustration of a semi-automatic torque-transmitting system according to the invention.

DETAILED DESCRIPTION OF THE INVENTION

The accompanying drawing shows an engine 10 with a starter and associated starter circuit 10a. The engine 10 is connected by way of a main drive friction clutch 14 and a transmission input shaft 15 to a three-shaft transmission 12 with a plurality of synchronized ratio gears. Fuel is supplied to the engine by way of a throttle-valve module 16 that includes a throttle valve 18 actuated by an accelerator pedal 19. The invention is equally applicable to Otto-cycle engines and Diesel engines with electronic or mechanical fuel injection.

The clutch 14 is actuated by a release fork 20 that is moved by a hydraulic slave cylinder 22 under the control of a clutch-actuator control means 38.

A gear-selector lever 24 is moved inside a guide pattern 50 with two legs 51 and 52 that are connected by a cross track 53, where the latter runs from the end of leg 52 to the midway point between the ends of leg 51. The guide pattern 50 defines five positions: "R" at the end of leg 52; "N" at the midpoint between the ends of cross track 53; "S" at the juncture of leg 51 and cross track 53; "+" and "−" at the extremities of leg 51. Within leg 51, the lever 24 is force-biased to the mid-position "S". The "N" position of the shift lever 24 corresponds to neutral; position "R" corresponds to reverse; position "S" corresponds to forward drive; moving the lever momentarily to the "+" position sends a command that causes the transmission to up-shift by one gear level; and moving the lever momentarily to the "−" position sends a command that causes the transmission to down-shift by one gear level.

The positions of lever 24 are monitored by a plurality of sensors, e.g., micro switches or optical sensors, that are arranged around the guide pattern 50. Signals from the sensors are sent to an electronic control unit 36. An output signal of the control unit 36 controls a shifting mechanism 25 which selects the gear levels of the transmission 12 in accordance with the movements of the lever 24 performed by the driver. The shifting mechanism 25 can include, e.g., hydraulic cylinders and solenoid control valves to drive actuating members for engaging and disengaging different gear ratios as disclosed, e.g., in applicant's earlier patent specification WO 97/05410.

In addition to the signals arriving from the shift lever 24, the control unit 36 receives signals:

from sensor 19*a*, indicative of the degree of depression of the accelerator pedal 19;

from sensor 30, indicative of the degree of aperture of the throttle valve 18;

from sensor 26, indicative of the engine rpm rate;

from sensor 42, indicative of the rpm rate of the driven plate of the clutch;

from sensor 34, indicative of the position of the clutch slave cylinder; and from sensor 32, indicative of the gear level selected.

The control unit 36 interprets and uses the signals from these sensors to control the actuation of clutch 14 when starting from stand-still and when shifting gears, as described, e.g., in applicant's earlier patent specifications EP 0038113, EP 0043660, EP 0059035, EP 0101220 and WO 92/13208, the contents of which are hereby expressly included by reference in the disclosure of the present patent application.

In addition to the aforementioned sensors, the control unit 36 also receives signals from the sensor system 52 of an anti-lock braking system (ABS), from the ignition switch 54, and from the brake switch 56 that belongs to the main braking system, e.g., to the foot brake 58 of the vehicle.

Connected to the control unit 36 is a warning buzzer. 50 to alert or warn the operator at the occurrence of certain operating conditions. Supplementary to or in place of the warning buzzer 50, it is possible to use a blinking warning light or other indicating means. In addition, there is a gear indicator 60 to indicate which gear level is currently engaged.

With the system described above, when the engine 10 is started by actuating the ignition switch 54 while the vehicle is standing still, the torque-transmitting system is activated, and the control unit 36 causes the clutch-actuating means 38, 22, 20 to disengage the clutch 14. In normal operation, moving the shift lever 24 from the neutral position "N" to the drive position "S" or the reverse position "R" will have the effect that the control unit 36 causes the shifting mechanism to engage either the lowest forward gear (first gear) or the reverse gear. As the accelerator pedal 19 is depressed for take-off, the control unit 36 will address the clutch-actuating means 38, 22, 20 to re-engage the clutch 14 and thereby set the vehicle in motion. To ensure a smooth take-off, the re-engagement of the clutch 14 is controlled by the control unit 36 in a manner disclosed, e.g., in EP 0038113, EP 0696341, or EP 0735957.

In a cold start where the transmission oil temperature is below 0° Celsius or the engine is idling at more than 1200 rpm, if after activation of the torque-transmitting system and disengagement of the clutch 14 the transmission stays in neutral for more than 5 seconds, the control system 36 will cause the clutch-actuating means 38, 22, 20 to re-engage the clutch 14 so that the transmission input shaft 15 will be set in motion and the transmission oil temperature will be raised by the rotation of meshed gears.

The clutch 14 remains engaged until:

a. a step is taken to engage a start-up gear, e.g., by moving the shift lever 24 from the neutral position "N" to the forward drive position "S" or the reverse gear position b. the transmission oil temperature rises above 0° Celsius;

c. the idle speed of the engine falls below 900 rpm; or d. the vehicle begins to move;

whereupon the control unit 36 will cause the clutch actuator means 38, 22, 20 to disengage the clutch 14, so that the process of starting up from stand-still can be continued in the normal way.

If within 5 seconds of activating the torque-transmitting system, the driver takes steps to actuate the brakes 58, depress the accelerator pedal 19 or move the shift lever 24, the warm-up mode as described above will be canceled. The warm-up mode can be resumed after 5 seconds, if the brakes 58 or the accelerator pedal 19 have been released or if the transmission has been returned to neutral either manually or automatically.

Various modifications may be made without departing from the invention. For example, the temperatures and time periods mentioned above are given only as examples and can be changed as needed.

While hydraulic means are used in the above embodiment for actuating the clutch and the shifting mechanism, it is also possible to use other suitable actuator means, for example pneumatic or electrical means such as electric motors or solenoid valves.

The present invention is also applicable to fully automated transmission systems where the shifting of all gear levels is controlled by the control unit 36 using, e.g., sets of characteristic curves corresponding to the ratios of the transmission 12.

A general embodiment of the torque-transmitting system for vehicles has a main drive clutch operable by means of a clutch-actuator, a transmission, a shift mechanism for setting the transmission ratio, a selector lever allowing the driver to select between a neutral mode or a drive mode of the transmission, and electronic control means for controlling the clutch actuator and the shift mechanism. The electronic control means will cause the clutch-actuator to disengage the clutch when the engine is started and to re-engage the clutch if the transmission has been left in neutral mode for a preprogrammed time period while the vehicle is standing still, so as to turn the input shaft of the transmission and thereby warm up the transmission oil.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A torque transmitting system for a vehicle, comprising:
   a main drive clutch,
   a clutch-actuating means for engaging and disengaging the main drive clutch;
   a transmission that has a neutral mode, a forward drive mode with a plurality with a plurality of transmission ratios, and a reverse drive mode,
   a shifting mechanism for setting and shifting the transmission to one of said modes and transmission ratios,
   a driver-operable selector means allowing a driver to select between said modes and transmission ratios,
   an electronic control means to control the clutch-actuating means and the shifting mechanism,
   wherein the electronic control means will cause the clutch-actuating means to disengage the clutch when an engine is started and will also cause the clutch-actuating means to re-engage the clutch under at least one re-engagement condition, said at least one re-engagement condition being that the transmission has been left in neutral mode for a preprogrammed time period while the vehicle is standing still, wherein, if the control means has caused the clutch-actuating means to re-engage the clutch after the preprogramed time period, said re-engagement is terminated and the clutch is taken out of engagement when a transmission temperature rises above a preprogrammed temperature level.

2. The torque-transmitting system of claim 1, wherein the preprogrammed time period has an order of magnitude between one and ten seconds.

3. The torque-transmitting system of claim 1, wherein the preprogrammed time period has an order of magnitude of five seconds.

4. The torque-transmitting system of claim 1, comprising at least one further re-engagement condition, said further re-engagement condition being that the transmission is found to have a temperature that is below a preprogrammed temperature level.

5. The torque-transmitting system of claim 1, comprising at least one further re-engagement condition, said further re-engagement condition being that the engine is found to be running at an idling rpm rate that is above a preprogrammed rpm rate.

6. The torque-transmitting system of claim 5, wherein the preprogrammed rpm rate is substantially 1200 revolutions per minute.

7. The torque-transmitting system of claim 1, wherein the preprogrammed temperature level is substantially zero degrees Celsius.

8. The torque-transmitting system of claim 1, wherein, if the control means has caused the clutch-actuating means to re-engage the clutch after the preprogrammed time period, said re-engagement is terminated and the clutch is taken out of engagement in the presence of an activity performed by the driver.

9. The torque-transmitting system of claim 8, wherein the vehicle further has a brake and a throttle, and wherein said activity is one of three activities consisting of:
   a. actuating the brake,
   b. actuating the throttle, and
   c. moving the selector means.

10. The torque-transmitting system of claim 1, wherein the transmission includes an input shaft and transmission oil, wherein the electronic control means will cause the clutch-actuating means to re-engage the clutch if the transmission has been left in neutral mode for a preprogrammed time period while the vehicle is standing still, in order to turn the input shaft and thereby warm up the transmission oil.

11. The torque-transmitting system of claim 1, wherein, if the control means has caused the clutch-actuating means to re-engage the clutch after the preprogramed time period, said re-engagement is terminated and the clutch is taken out of engagement in the presence of at least one of the conditions of:
   a. an activity taking place to engage a start-up gear;
   b. an idling rpm rate of the engine falling below a preprogrammed rpm rate; and
   c. the vehicle starting to move.

* * * * *

UNITED STATES PATENT AND TRADEMARK OFFICE
CERTIFICATE OF CORRECTION

PATENT NO. : 6,440,039 B1
DATED : August 27, 2002
INVENTOR(S) : Robin J. Warren

It is certified that error appears in the above-identified patent and that said Letters Patent is hereby corrected as shown below:

<u>Title page,</u>
Item [73], Assignee, delete "Luk Lamellen und Kupplungsbau GmbH, Buhl/Baden" and substitute -- LuK Lamellen und Kupplungsbau Beteiligungs KG, Buhl --.

Signed and Sealed this

Twenty-ninth Day of April, 2003

JAMES E. ROGAN
*Director of the United States Patent and Trademark Office*